(12) United States Patent
Hisamura et al.

(10) Patent No.: US 10,618,489 B2
(45) Date of Patent: Apr. 14, 2020

(54) UTILITY VEHICLE

(71) Applicant: KAWASAKI JUKOGYO KABUSHIKI KAISHA, Hyogo (JP)

(72) Inventors: Takashi Hisamura, Hyogo (JP); Kazumasa Hisada, Hyogo (JP); Masato Kinoshita, Hyogo (JP)

(73) Assignee: KAWASAKI JUKOGYO KABUSHIKI KAISHA, Hyogo (JP)

( * ) Notice: Subject to any disclaimer, the term of this patent is extended or adjusted under 35 U.S.C. 154(b) by 94 days.

(21) Appl. No.: 15/880,985

(22) Filed: Jan. 26, 2018

(65) Prior Publication Data
US 2019/0232910 A1    Aug. 1, 2019

(51) Int. Cl.
| B62D 25/06 | (2006.01) |
| B60R 21/13 | (2006.01) |
| B62D 39/00 | (2006.01) |
| B62D 27/06 | (2006.01) |

(52) U.S. Cl.
CPC .............. *B60R 21/13* (2013.01); *B62D 27/06* (2013.01); *B62D 39/00* (2013.01)

(58) Field of Classification Search
CPC .. B62D 21/183; B62D 43/02; B62D 33/0625; B60N 2/24; B60J 5/047; B60J 5/0487; B60G 11/265; B60G 3/02; B60K 11/04; B60K 13/04; B60R 2022/3402; B60R 2022/027; B60R 22/34; B60Y 2400/72
USPC ............ 280/796, 798; 296/205, 183.2, 183.1
See application file for complete search history.

(56) References Cited

U.S. PATENT DOCUMENTS

| 7,249,798 B2 * | 7/2007 | Saito ........................ B60N 2/24 280/756 |
| 8,499,882 B2 * | 8/2013 | Tsumiyama ........... B60N 2/012 180/311 |
| 8,827,357 B2 * | 9/2014 | Kaku ...................... B60R 21/13 296/190.03 |
| 9,457,756 B2 * | 10/2016 | Hirooka .................. B60R 21/13 |
| 2009/0184531 A1 * | 7/2009 | Yamamura ........... B60N 2/3011 296/37.6 |
| 2015/0259011 A1 * | 9/2015 | Deckard .............. B62D 21/183 280/781 |

* cited by examiner

*Primary Examiner* — Toan C To
(74) *Attorney, Agent, or Firm* — Wenderoth, Lind & Ponack, L.L.P.

(57) ABSTRACT

A utility vehicle of the present invention comprises a chassis; and a R.O.P.S. provided on the chassis and surrounding a cabin, wherein the R.O.P.S. includes a pair of left and right front pillars, a pair of left and right side beams, a pair of left and right rear pillars, and a front beam and a rear beam which extend in a width direction of a vehicle body, the R.O.P.S. has a connecting portion connecting a rear end of the side beam, a side end of the rear beam and an upper end of the rear pillar, and between the connecting portion and a rear portion of the chassis, a rear support for supporting the R.O.P.S. from a rear side is disposed.

9 Claims, 8 Drawing Sheets

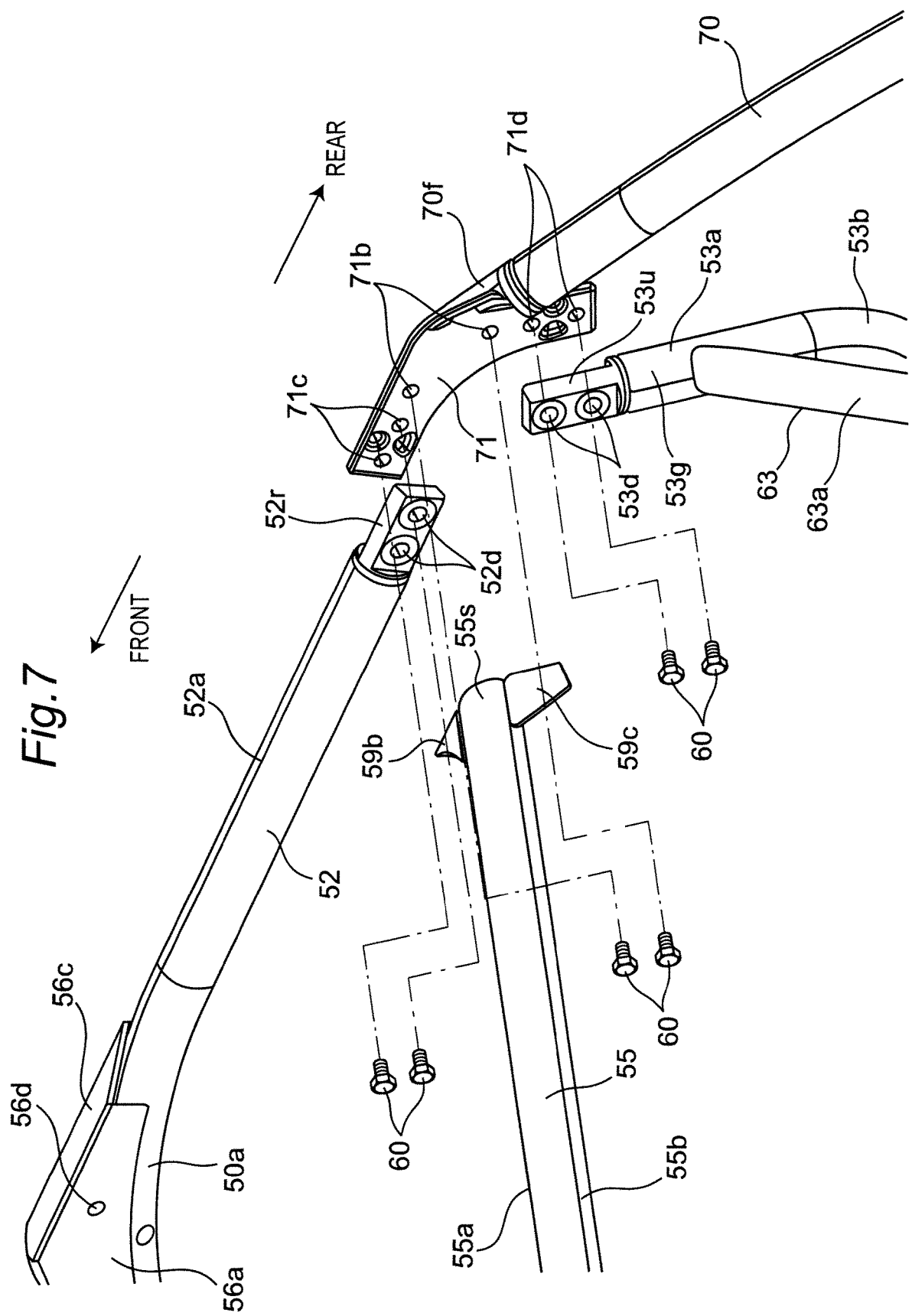

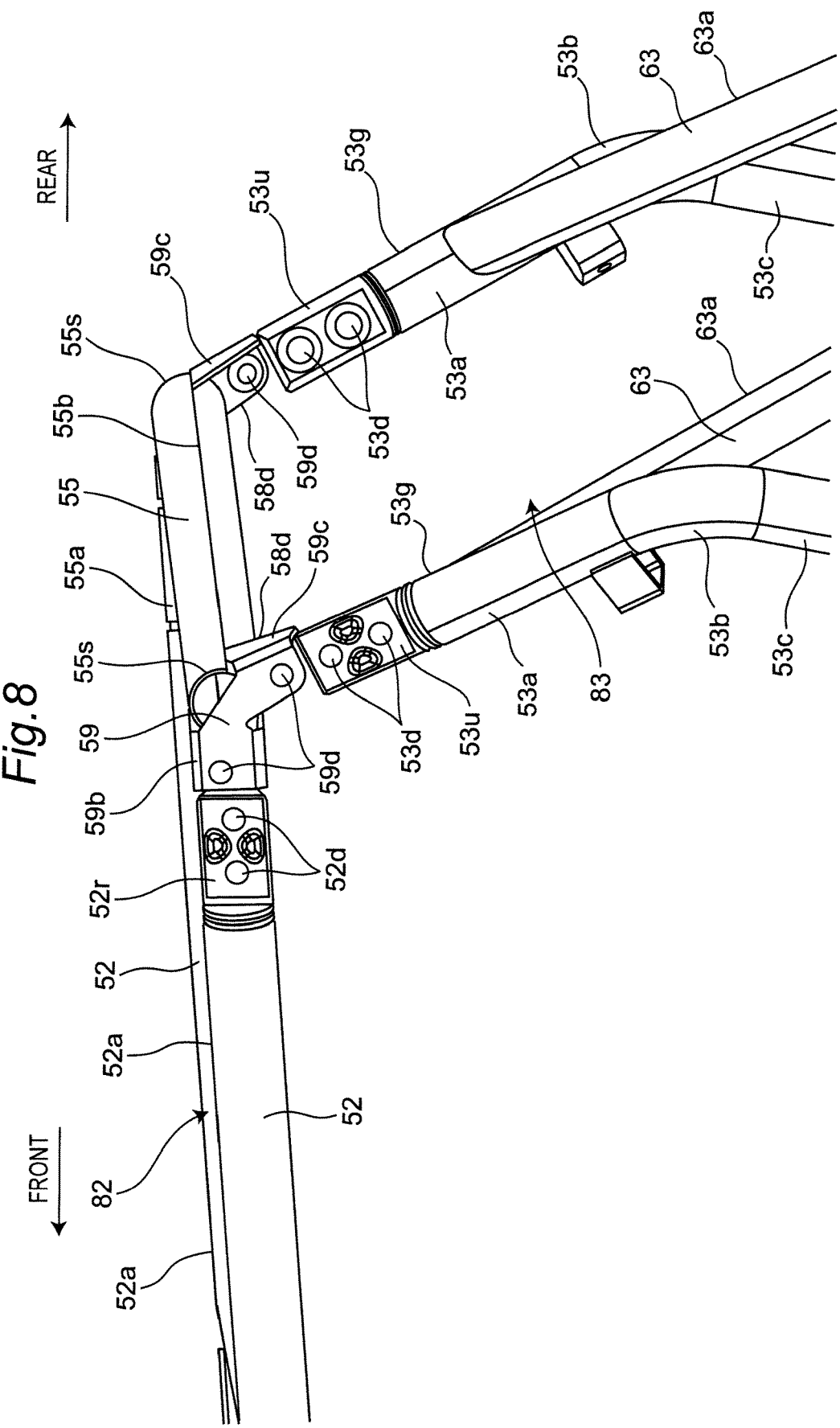

UTILITY VEHICLE

BACKGROUND OF THE INVENTION

1. Field of the Invention

The present invention relates to a utility vehicle.

2. Description of the Related Art

A utility vehicle has been known that enhances the running performance on rough terrains. It is disclosed that a R.O.P.S. (Roll-Over Protective Structure) for protecting a cabin is provided on a chassis in a utility vehicle (for example, US2015/0259011 A1, and the like).

Since a utility vehicle travels on rough terrains such as fields and mountains, wasteland, sloping land and the like which are not paved, the utility vehicle has a risk of unexpected falling down. Therefore, a utility vehicle may be provided with a R.O.P.S. to protect an occupant in case of unexpected falling down. A R.O.P.S. is constituted by a framework including, for example, four front, rear, right and left pillars, and multiple beams connecting the pillars. As rigidity of a R.O.P.S. is enhanced, deformation of the R.O.P.S. is suppressed and safety of an occupant can be further improved.

SUMMARY OF THE INVENTION

An object of the present invention is to provide a utility vehicle including a R.O.P.S. in which rigidity is enhanced.

In order to achieve the above object, according to one aspect of the present invention, a utility vehicle comprising:
a chassis; and
a R.O.P.S. provided on the chassis and surrounding a cabin, wherein
the R.O.P.S. includes a pair of left and right front pillars, a pair of left and right side beams, a pair of left and right rear pillars, and a front beam and a rear beam which extend in a width direction of a vehicle body,
the R.O.P.S. has a connecting portion connecting a rear end of the side beam, a side end of the rear beam and an upper end of the rear pillar, and
between the connecting portion and a rear portion of the chassis, a rear support for supporting the R.O.P.S. from a rear side is disposed.

According to one aspect of the present invention, since the R.O.P.S. is supported from the rear side by the rear support disposed between the connecting portion and the rear portion of the chassis, when stress in a longitudinal direction of the vehicle body, in a width direction of the vehicle body and in a height direction of the vehicle body is applied to the R.O.P.S., stress is dispersed to the chassis via the rear support, and thereby rigidity of the R.O.P.S. is enhanced.

BRIEF DESCRIPTION OF THE DRAWINGS

These and other objects and features of the present invention will become apparent from the following description taken in conjunction with the preferred embodiments thereof with reference to the accompanying drawings, in which:

FIG. 7 is a developed view of the vicinity of a connecting portion at a rear side of the R.O.P.S. shown in FIG. 2;

FIG. 8 is a perspective view of a state in which a rear support is removed from the R.O.P.S. shown in FIG. 2.

DETAILED DESCRIPTION OF THE INVENTION

With reference to the attached drawings, a utility vehicle 1 according to one embodiment will be described. The utility vehicle 1 is a vehicle for mainly traveling on rough terrains such as fields and mountains, wasteland, sloping land and the like which are not paved. For convenience of explanation, a traveling direction of the utility vehicle 1 is set to be a "front side" of the utility vehicle 1 and each constitutional element, a reverse direction of the traveling direction of the utility vehicle 1 is set to be a "rear side" of the utility vehicle 1 and each constitutional element and left and right sides in a width direction of a vehicle body as viewed from an occupant are set as "left and right sides" of the utility vehicle 1 and each constitutional element.

<Overall Structure of Vehicle>

Figure 1:
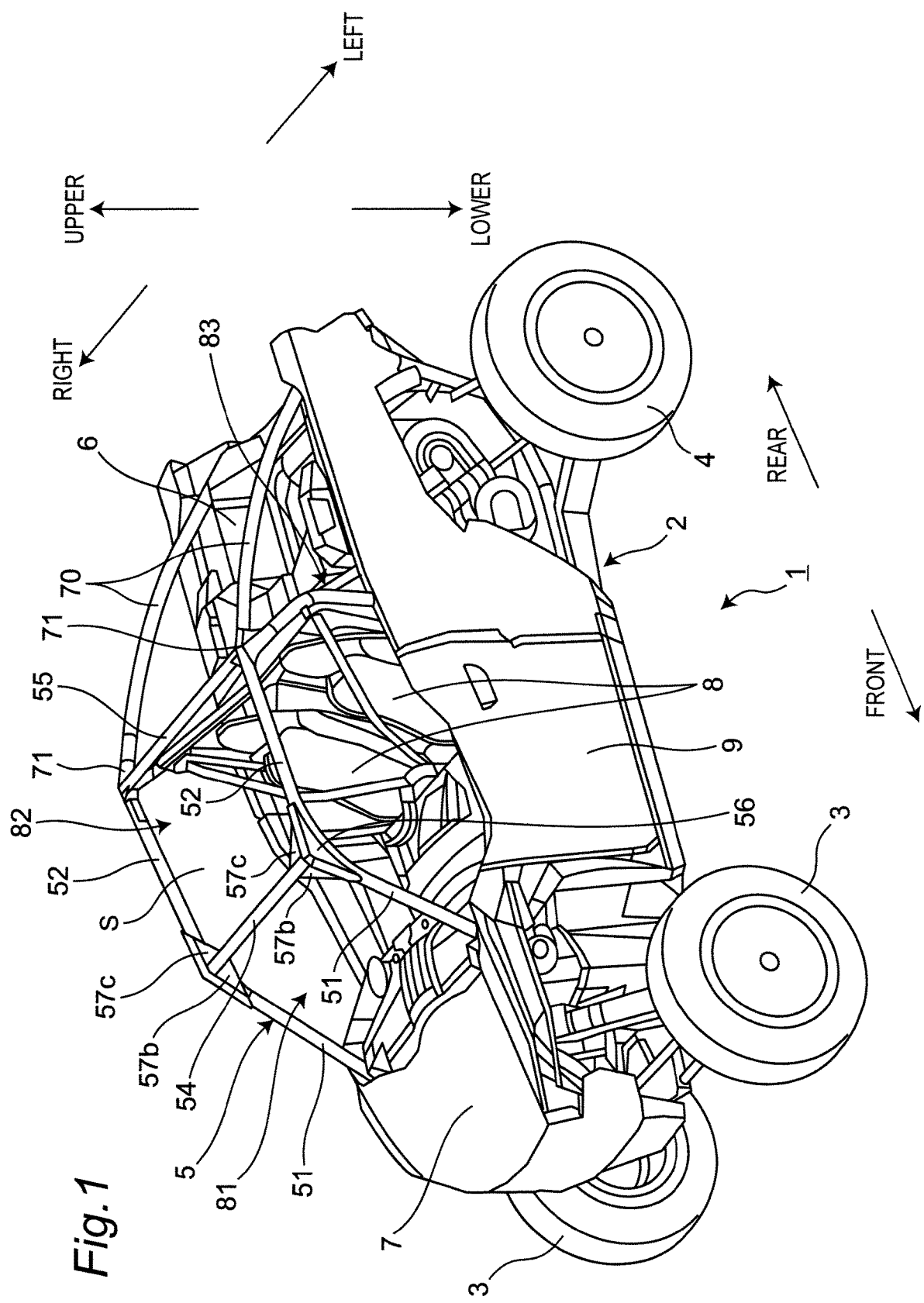
FIG. 1 is a perspective view of a utility vehicle according to one embodiment of the present invention as viewed from a front left side.

FIG. 1 is a perspective view of the utility vehicle 1 according to one embodiment of the present invention as viewed from a front left side.

As shown in FIG. 1, the utility vehicle 1 includes a chassis 2 and a R.O.P.S. 5 provided on the chassis 2. The chassis 2 is a vehicle body framework part other than the R.O.P.S. 5. A pair of left and right front wheels 3 is supported at a front part of the chassis 2, and a pair of right and left rear wheels 4 is supported at a rear part of the chassis 2.

The R.O.P.S. (Roll-Over Protective Structure) 5 is a frame structure provided on the chassis 2 to protect a cabin (or riding space) S from impact. The cabin S is a space where the occupant gets on. The cabin S is located between the right and left front wheels 3 and the left and right rear wheels 4. A carrier 6 is disposed at a rear side of the cabin S, and a bonnet 7 is disposed at a front side of the cabin S. In the cabin S, a pair of left and right seats 8 of an independent type is disposed. A steering wheel and a dash panel are disposed in front of the seats 8. For example, an engine (not shown) is disposed from a space below the seats 8 to a space below the front portion of the carrier 6. As an optional accessory member, in addition to a door 9, a windshield 91, a roof 92, a rear windshield 93 and the like which will be described later can be mounted to the R.O.P.S. 5.

<Structure of Chassis>

Figure 2:
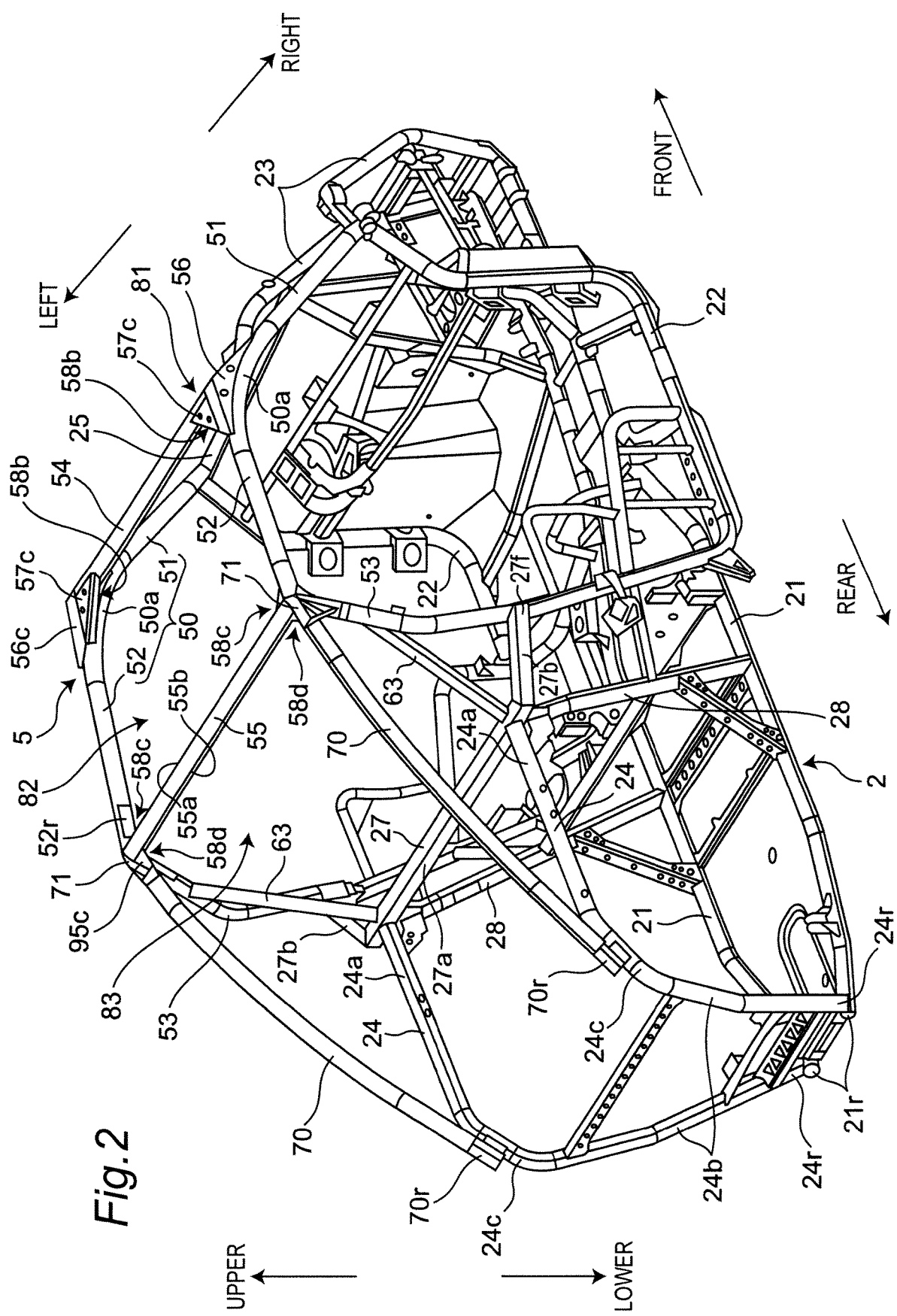
FIG. 2 is a perspective view of a chassis and a R.O.P.S. of the utility vehicle shown in FIG. 1 as viewed from a right rear side.
Figure 3:
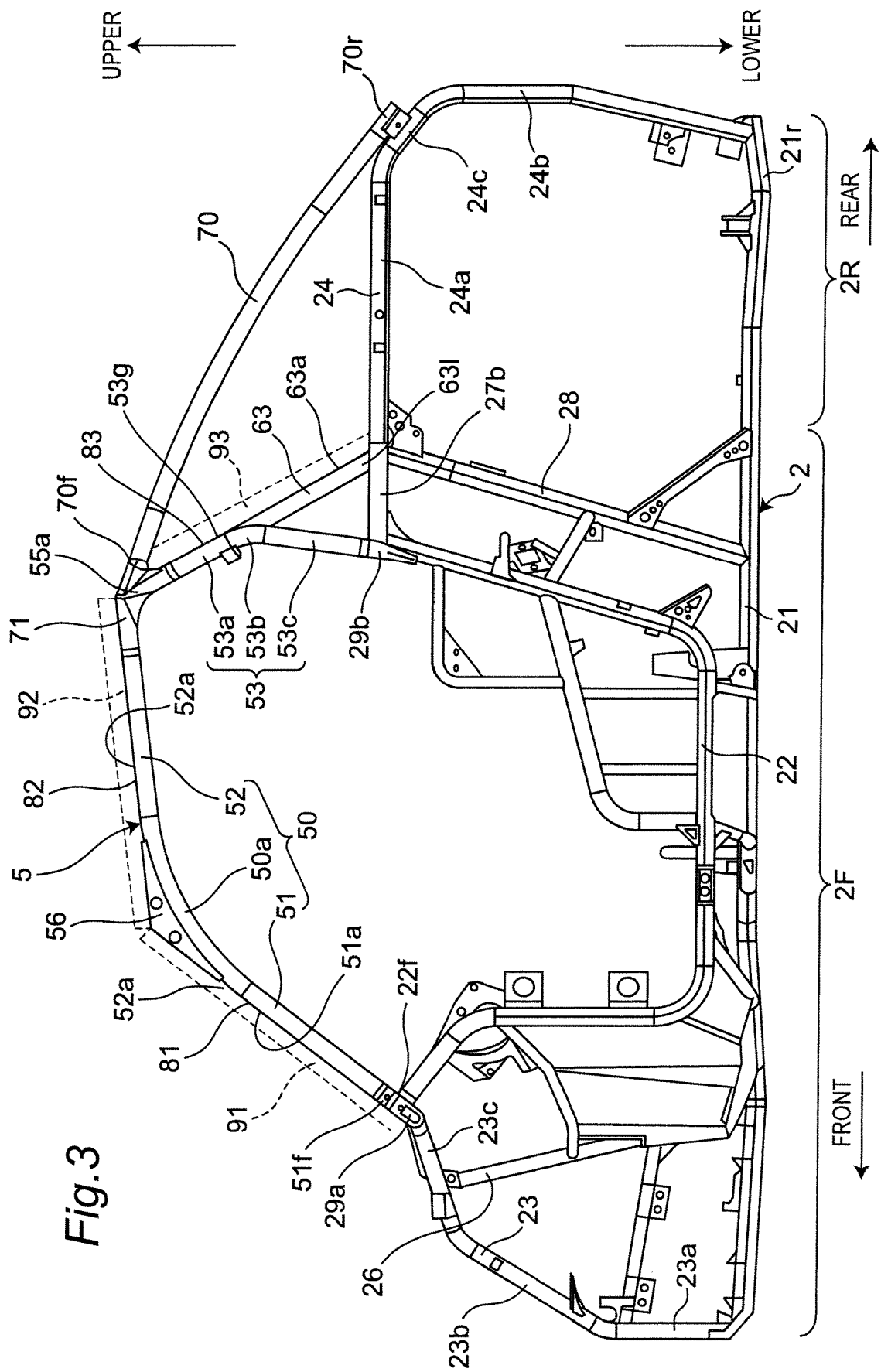
FIG. 3 is a left side view of the chassis and the R.O.P.S. shown in FIG. 2.

FIG. 2 is a perspective view of the chassis 2 and the R.O.P.S. 5 of the utility vehicle 1 shown in FIG. 1 as viewed from a right rear side. FIG. 3 is a left side view of the chassis 2 and the R.O.P.S. 5 shown in FIG. 2. As shown in FIGS. 2 and 3, the chassis 2 is constituted by combining multiple pipe members and plate members. The pipe members constituting the chassis 2 have, for example, a rectangular or circular cross section and are made of metal. The chassis 2 has a pair of right and left main frames 21, a pair of left and right side frames 22, a pair of left and right front frames 23, a pair of left and right rear frames 24, and a rear cross member 27.

In the present application, based on a cross member of the chassis 2 to which a constitutional element located most rearward in a longitudinal direction of the vehicle body among the R.O.P.S. 5 is connected, specifically based on the rear cross member 27, the front and rear sides in the longitudinal direction of the vehicle body than the rear cross member 27 are defined as a front portion 2F and a rear portion 2R of the chassis 2, respectively. Therefore, in the present application, for example, the side frame 22 corresponds to the front portion 2F of the chassis 2, and the rear frame 24 corresponds to the rear portion 2R of the chassis 2.

The main frame 21 forms a framework of the chassis 2 and extends in the longitudinal direction of the vehicle body (front-rear direction of the vehicle body). On a lateral side of the main frame 21, the side frame 22 is disposed. On a front upper part of the main frame 21, the front frame 23 is erected. On a rear upper part of the main frame 21, the rear frame 24 is erected. The main frame 21, the side frame 22, the front frame 23 and the rear frame 24 are configured to be substantially symmetrical with respect to a width direction of the vehicle body (left-right direction of the vehicle body). At least one cross bar (no reference number) is provided between the pair of left and right main frames 21, between the main frame 21 and the side frame 22, between the pair of left and right front frames 23, and between the pair of left and right rear frames 24, respectively. By connecting each frame to the cross bar in the width direction of the vehicle body, rigidity in the width direction of the vehicle body is enhanced.

The side frame 22 is positioned outside the width direction of the vehicle body with respect to the main frame 21, and is connected to the main frame 21 by multiple cross bars (no reference number). The side frame 22 extends in the longitudinal direction of the vehicle body as a whole, and is approximately U-shaped in side view. The side frame 22 has a front end 22f at the front side in the longitudinal direction of the vehicle body and above a height direction of the vehicle body (vertical direction of the vehicle body). The side frame 22 has a rear end 22r at the rear side in the longitudinal direction of the vehicle body and above the height direction of the vehicle body.

The front frame 23 includes a front longitudinal frame portion 23a, a central oblique frame portion 23b, and a front oblique frame portion 23c. The front longitudinal frame portion 23a extends in the height direction of the vehicle body. The central oblique frame portion 23b extends upward and obliquely rearward from the front longitudinal frame portion 23a. The front oblique frame portion 23c extends toward the outside in the width direction of the vehicle body and obliquely upward and rearward from the central oblique frame portion 23b. A front end (no reference number) of the front longitudinal frame portion 23a is fixed to a front end (no reference number) of the main frame 21 by welding and the like. A rear end (no reference number) of the front oblique frame portion 23c is fixed to a front cross member 25 by welding and the like. The front cross member 25 extends in the width direction of the vehicle body, and is approximately U-shaped in front view. The front cross member 25 is supported by a front support frame 26 erected obliquely frontward at a front portion of the main frame 21.

The rear frame 24 is positioned at the rear portion 2R of the chassis 2, extends in the longitudinal direction of the vehicle body as a whole, and is curved to be approximately L-shaped in side view. The rear frame 24 includes a rear upper frame portion 24a, a rear longitudinal frame portion 24b, and a rear curved frame portion 24c. The rear upper frame portion 24a extends in the longitudinal direction of the vehicle body. The rear vertical frame portion 24b extends obliquely in the height direction of the vehicle body and inward in the width direction of the vehicle body. The rear curved frame portion 24c is curved so as to connect the rear upper frame portion 24a to the rear longitudinal frame portion 24b. In the rear frame 24, a rear end 24r of the rear longitudinal frame portion 24b is fixed to a rear end 21r of the main frame 21 by welding and the like. A front end (no reference number) of the rear upper frame portion 24a is fixed to the rear cross member 27 by welding and the like.

The rear cross member 27 is, for example, a hollow pipe having a rectangular cross section. The rear cross member 27 has a rear lateral bar portion 27a and left and right rear oblique bar portions 27b. The rear lateral bar portion 27a is positioned at a center of the rear cross member 27 and extends in the width direction of the vehicle body. The rear oblique bar portion 27b is located at a lateral side of the rear lateral bar portion 27a, and extends obliquely from the rear side to the front side toward the outside in the width direction of the vehicle body. The rear lateral bar portion 27a of the rear cross member 27 is supported by a rear support frame 28 erected obliquely rearward in the main frame 21.

A front bracket 29a of the front cross member 25 is fixed to left and right side ends 25s of the front cross member 25 by welding and the like. The front bracket 29a is fixed to the front end 22f of the side frame 22, for example, by bolts and the like. In the rear cross member 27, left and right front ends 27f of the rear oblique bar portion 27b are fixed to the rear end 22r of the side frame 22 via the rear bracket 29b, for example, by bolts 60 and the like.

<Structure of R.O.P.S.>

Figure 4:
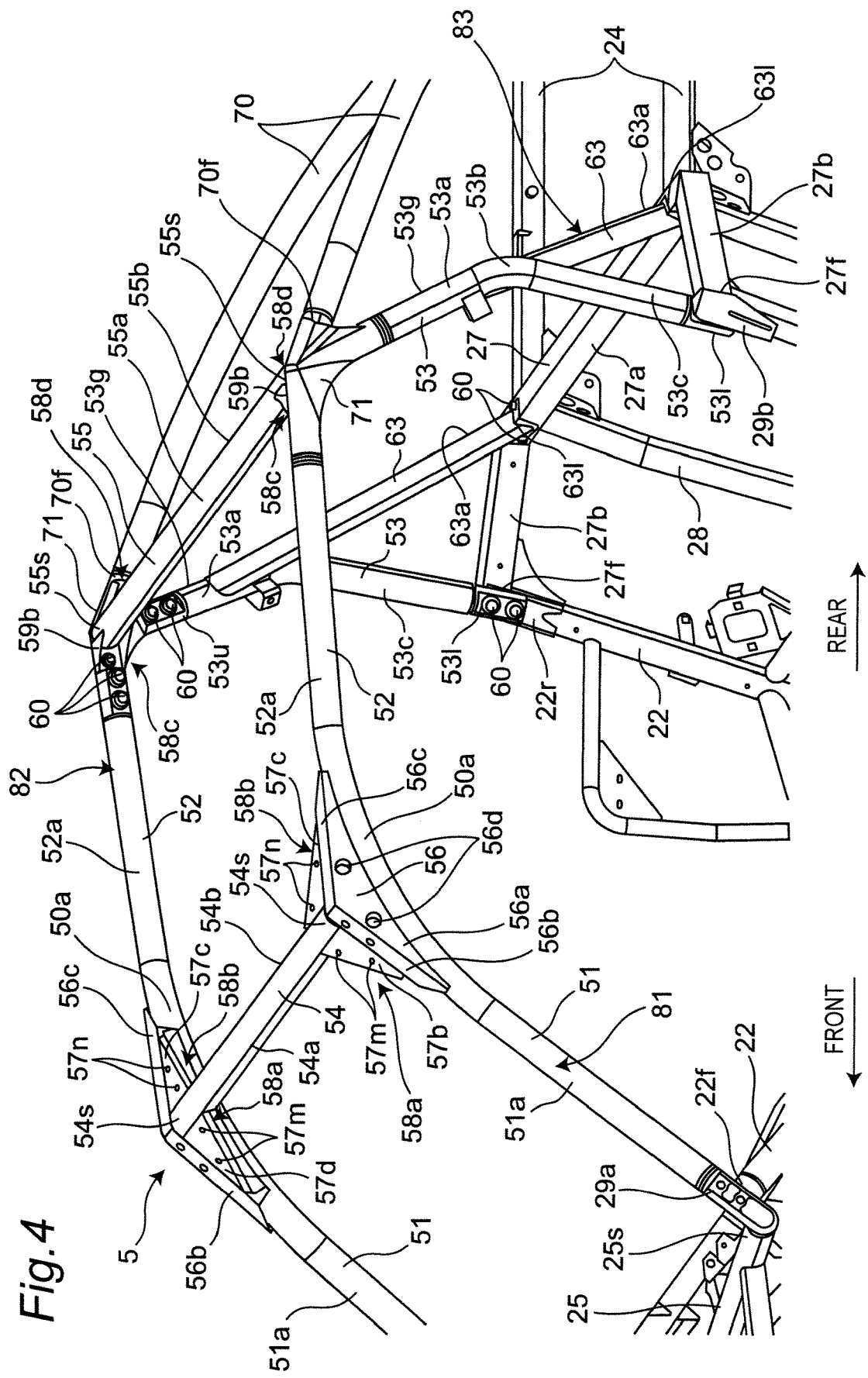
FIG. 4 is a perspective view of a portion of the R.O.P.S. shown in FIG. 2 as viewed from a front left side.
Figure 5:
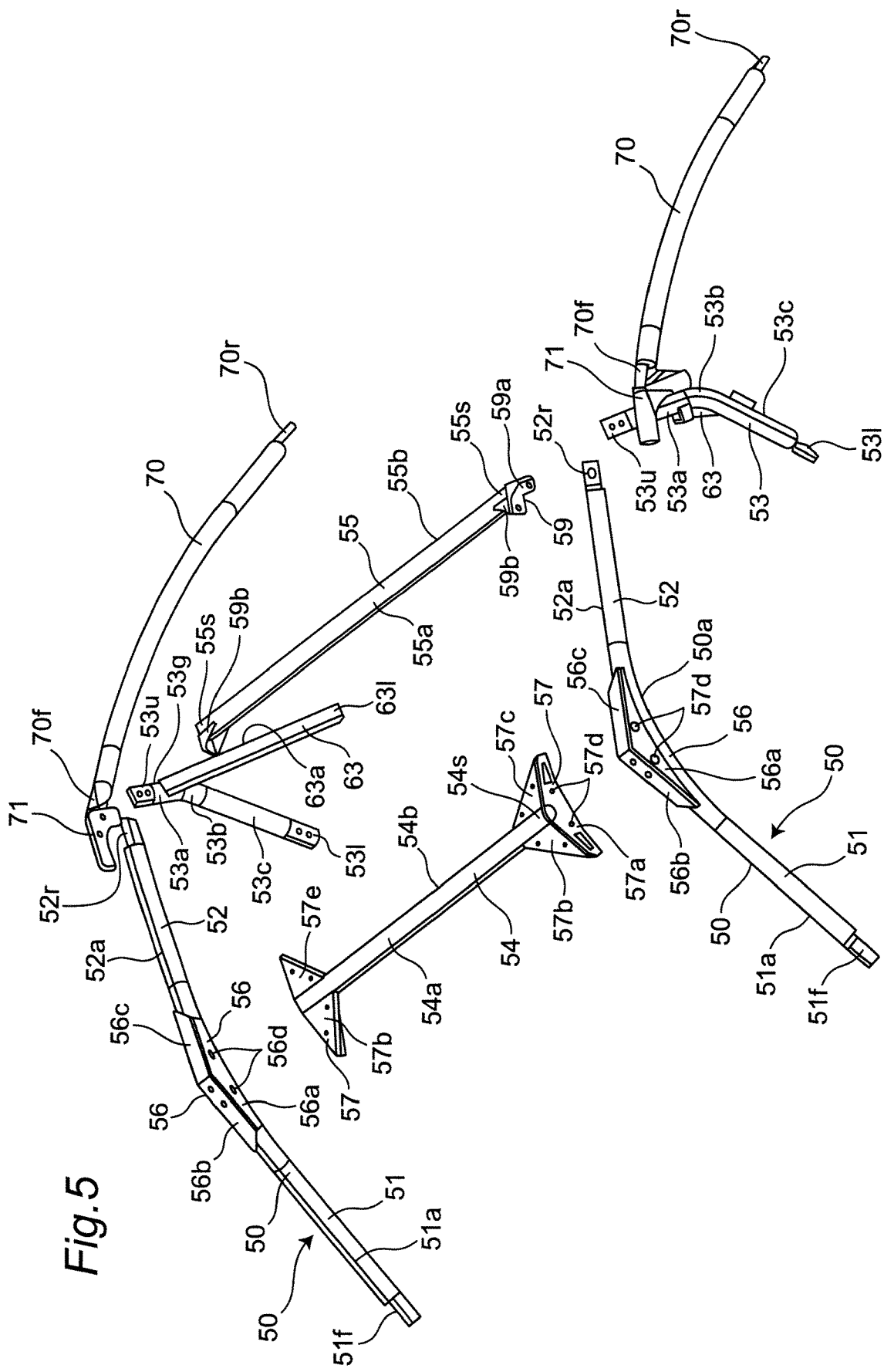
FIG. 5 is a perspective view in which the R.O.P.S. shown in FIG. 2 is developed.
Figure 6:
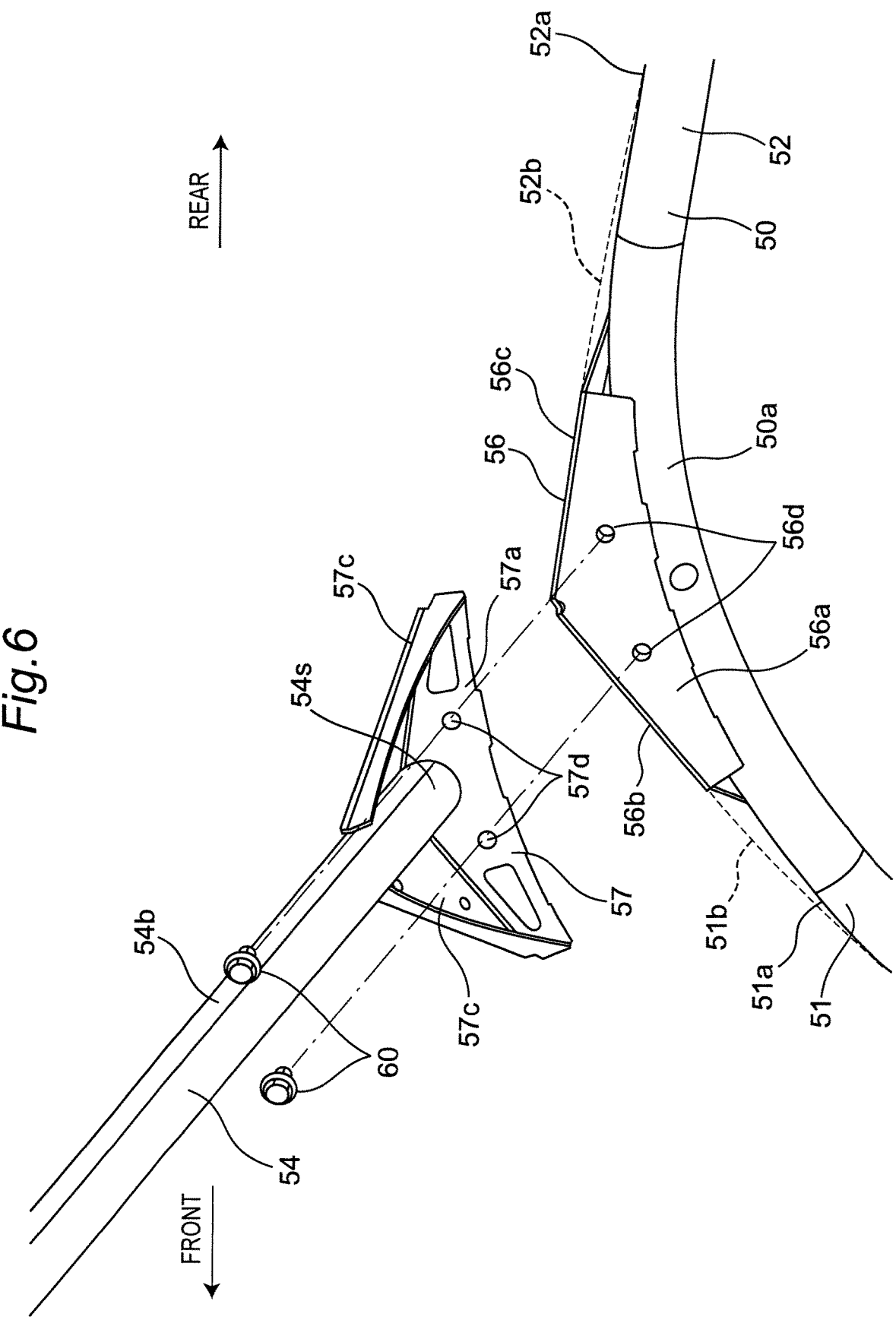
FIG. 6 is a developed view of the vicinity of a curved portion of a front side roof of the R.O.P.S. shown in FIG. 2.

With reference to FIGS. 2 to 8, a structure of the R.O.P.S. 5 will be described. FIG. 4 is a perspective view of a portion of the R.O.P.S. 5 shown in FIG. 2 as viewed from a front left side. FIG. 5 is a perspective view in which the R.O.P.S. 5 shown in FIG. 2 is developed. FIG. 6 is a developed view of the vicinity of a curved portion 50a of a front side roof 50 of the R.O.P.S. 5 shown in FIG. 2. FIG. 7 is a developed view of the vicinity of a connecting portion 71 at a rear side of the R.O.P.S. 5 shown in FIG. 2. FIG. 8 is a perspective view of a state in which a rear support 70 is removed from the R.O.P.S. 5 shown in FIG. 2.

As shown in FIG. 2, the R.O.P.S. 5 includes a pair of left and right front pillars 51, a pair of left and right side beams 52, a pair of left and right rear pillars 53, a front beam 54, and a rear beam 55. The R.O.P.S. 5, for example, is composed of multiple hollow pipe members. The hollow pipe members constituting the R.O.P.S. 5, for example, have a rectangular or circular cross section, and are made of metal. The front pillar 51 extends substantially straight in the obliquely rearward direction of the vehicle body. The side beam 52 extends substantially straight in the longitudinal direction of the vehicle body. The rear pillar 53 extends in the height direction of the vehicle body while being bent. The front beam 54 and the rear beam 55 extend substantially straight in the width direction of the vehicle body. As will be described later, the R.O.P.S. 5 is supported from the rear side by a rear support 70.

The front pillar 51 and the side beam 52 are configured as a front side roof 50 that extends continuously in the longitudinal direction of the vehicle body by bending a single round pipe member into a rounded approximately L-shape. Hereinafter, in the front side roof 50, a portion formed by bending it into the rounded approximately L-shape is referred to as a curved portion 50a. In the front side roof 50, the front part in the longitudinal direction of the vehicle body than the curved portion 50a corresponds to the front pillar 51, and the rear part in the longitudinal direction of the vehicle body than the curved portion 50a corresponds to the side beam 52. Accordingly, the front side roof 50 includes the front pillar 51, the curved portion 50a, and the side beam 52 in this order from the front side to the rear side of the vehicle body. A front end 51f of the front pillar 51 is fixed to the front bracket 29a of the front cross member 25 and the front end 22f of the side frame 22, for example, by bolts and the like. Furthermore, the front pillar 51 and the side beam 52 may be formed as a separate body and may be fixed to each other via a bracket.

As shown in FIG. 4, the front beam 54 extending in the width direction of the vehicle body is disposed between the left and right front side roofs 50. Specifically, the front beam 54 is disposed on the periphery of the curved portion 50a of the front side roof 50, that is, on an upper portion of the curved portion 50a. Furthermore, the front beam 54 may be disposed on the curved portion 50a of the front side roof 50.

A first bracket 56 is fixed to the upper portion of the curved portion 50a, for example, by welding. The first bracket 56 has a first mounting portion 56a, a front pillar mounting portion 56b, and a side beam mounting portion 56c. The first mounting portion 56a has a substantially triangular shape in side view and has a substantially flat plate shape extending in the height direction of the vehicle body. The front pillar mounting portion 56b is substantially flush with a ridge line 51a of the front pillar 51 in side view and has a substantially flat plate shape. The side beam mounting portion 56c is substantially flush with a side ridge line 52a of the side beam 52 in side view and has a substantially flat plate shape. The front pillar mounting portion 56b and the side beam mounting portion 56c are adjacent to each other in the longitudinal direction of the vehicle body. In the first mounting portion 56a, for example, two first through holes 56d are formed.

As shown in FIG. 5, the front pillar 51, the curved portion 50a, and the side beam 52 are formed by bending the front side roof 50 into a rounded approximately L-shape. As a result, as shown in FIG. 6, there is a gap between a virtual front pillar ridge line 51b formed by extending the ridge line 51a of the front pillar 51 in side view virtually rearward, and the curved portion 50a. The front pillar mounting portion 56b having a substantially flat plate shape is disposed so as to fill the gap and to be aligned with the virtual front pillar ridge line 51b. Therefore, the ridge line 51a of the front pillar 51 in side view is substantially flush with the front pillar mounting portion 56b. Similarly, there is a gap between a virtual side beam ridge line 52b formed by extending the ridge line 52a of the side beam 52 in side view virtually frontward, and the curved portion 50a. The side beam mounting portion 56c having a substantially flat plate shape is disposed so as to fill the gap and to be aligned with the virtual side beam ridge line 52b. Therefore, the ridge line 52a of the side beam 52 in side view is substantially flush with the side beam mounting portion 56c.

The front pillar mounting portion 56b and the side beam mounting portion 56c are disposed so as to be bent at a certain bending angle in side view. As will be described later, on a front surface of the R.O.P.S. 5, a substantially flat front surface part 81 including left and right front pillar mounting portions 56b is formed, and on an upper surface of the R.O.P.S. 5, a substantially flat upper surface part 82 including left and right side beam mounting portions 56c is formed. Since the front surface part 81 and the upper surface part 82 are formed as a substantially flat surface, respectively, a plate-like or sheet-like accessory member can be mounted in close contact with the front surface part 81 and the upper surface part 82.

As shown in FIGS. 5 and 6, a second bracket 57 is fixed to each of the left and right side ends 54s of the front beam 54, for example, by welding. The second bracket 57 has a second mounting portion 57a, a front support portion 57b, and a front roof support portion 57c. The second mounting portion 57a has a substantially triangular shape in side view, and has a substantially flat plate shape. The front support portion 57b is substantially flush with the front pillar mounting portion 56b of the first bracket 56. The front roof support portion 57c is substantially flush with the side beam mounting portion 56c of the first bracket 56. If the front support portion 57b and the front roof support portion 57c are disposed on the side of the front side roof 50, the front support portion 57b and the front roof support portion 57c protrude from the front side roof 50 in the width direction of the vehicle body, and the shapes of the left and right front side roofs 50 are different, and thereby it takes time and effort to assemble the R.O.P.S. 5. Therefore, workability when assembling the R.O.P.S. 5 will be deteriorated. On the other hand, since the front support portion 57b and the front roof support portion 57c are provided on the second bracket 57 of the front beam 54, workability when assembling the R.O.P.S. 5 is good.

The second mounting portion 57a has a substantially triangular shape in side view, and has a substantially flat plate shape extending in the height direction of the vehicle body. In the second mounting portion 57a, two second through holes 57d corresponding to the first through holes 56d of the first mounting portion 56a are formed. The front support portion 57b is disposed so as to fit to a front corner portion 58a formed at an intersection of the front pillar 51 and the front beam 54. The front support portion 57b has a substantially triangular shape in front view, and has a substantially flat plate shape. In the front support portion 57b, for example, two penetrating front mounting holes 57m are formed. The front roof support portion 57c is disposed so as to fit to a front roof corner portion 58b formed at an intersection of the front beam 54 and the side beam 52. The front roof support portion 57c is substantially triangular in plane view, and has a substantially flat plate shape. In the front roof support portion 57c, for example, two penetrating upper mounting holes 57n are formed. When the front beam 54 is connected to the front side roof 50, the front support portion 57b fitted to the front corner portion 58a, and the front roof support portion 57c fitted to the front roof corner portion 58b serve as a gusset, respectively. Therefore, rigidity of the R.O.P.S. 5 is enhanced.

When the front beam 54 is connected to the front side roof 50, the first mounting portion 56a of the first bracket 56 and the second mounting portion 57a of the second bracket 57 come into contact with each other in an approximately surface contacted state. Thereafter, the first bracket 56 and the second bracket 57 are fastened, for example, by utilizing the bolts 60 inserted through the first through holes 56d and the second through holes 57d, and the nuts. Thereby, the second bracket 57 is fixed to the first bracket 56. As a result, the front beam 54 is fixed to the curved portion 50a of the front side roof 50. That is, the front beam 54 is fixed to the front side roof 50 constituting the front pillar 51 and the side beam 52.

As shown in FIGS. 5, 7 and 8, a third bracket 59 is fixed to each of the left and right side ends 55s of the rear beam 55, for example, by welding. The third bracket 59 includes a third mounting portion 59a, a rear roof support portion 59b, and a rear support portion 59c. The third mounting portion 59a is approximately inverted V-shaped in side view, and has a substantially flat plate shape extending in the height direction of the vehicle body. In the third mounting portion 59a, for example, two third through holes 59d are formed. The rear roof support portion 59b is substantially flush with the ridge line 52a of the side beam 52 in side view. The rear support portion 59c is substantially flush with the ridge line 53g of the rear pillar upper portion 53a of the rear pillar 53 in side view. As well as the front support portion 57b and the front roof support portion 57c, since the rear roof support portion 59b and the rear support portion 59c are provided on the third bracket 59 of the rear beam 55, workability when assembling the R.O.P.S. 5 is good.

The rear roof support portion 59b is disposed so as to fit to a rear roof corner portion 58c formed at an intersection of the side beam 52 and the rear beam 55. The rear roof support portion 59b has a substantially triangular shape in plane view, and has a substantially flat plate shape. The rear support portion 59c is disposed so as to fit to the rear corner portion 58d formed at an intersection of the rear beam 55 and the rear pillar 53. The rear support portion 59c has a substantially triangular shape in rear view, and has a substantially flat plate shape. In a rear end 52r of the side beam 52, for example, two fourth through holes 52d are formed. As will be described later, when the rear beam 55 is connected to the side beam 52 via a connecting portion 71, the rear roof support portion 59b fits to the rear roof corner portion 58c, and thereby the rear roof support portion 59b serves as the gusset. Further, when the rear beam 55 is connected to the rear support 70 via the connecting portion 71, the rear support portion 59c fits to the rear corner portion 58d, and thereby the rear support portion 59c serves as the gusset. Therefore, rigidity of the R.O.P.S. 5 is enhanced by each of the rear roof support portion 59b and the rear support portion 59c.

As shown in FIGS. 2 and 4, the rear pillar 53 extends in the height direction of the vehicle body while being bent, and is connected to the rear cross member 27 of the chassis 2. The rear pillar 53 includes a rear pillar upper portion 53a, a rear pillar bent portion 53b, and a rear pillar lower portion 53c in order from an upper side to a lower side of the vehicle body. The rear pillar upper portion 53a extends rearward from the front side of the vehicle body, and extends obliquely outward in the width direction of the vehicle body. The rear pillar lower portion 53c extends downward from the upper side of the vehicle body, and extends obliquely from the rear side to the front side of the vehicle body. The rear pillar bent portion 53b is bent so as to connect the rear pillar upper portion 53a to the rear pillar lower portion 53c.

In the rear pillar 53, at an upper end 53u of the rear pillar upper portion 53, for example, two fifth through holes 53d are formed, and at a lower end 53l of the rear pillar lower portion 53c, for example, two sixth through holes (no reference number) are formed. The lower end 53l of the rear pillar lower portion 53c is fixed to the front end 27f of the rear oblique bar portion 27b of the rear cross member 27 and the rear end 22r of the side frame 22, for example, via a rear bracket 29b having blind screw holes, by bolts 60 and the like.

The rear pillar 53 has a branch pillar 63 above the rear pillar bent portion 53b, that is, at the rear pillar upper portion 53a. The branch pillar 63 extends downward from the upper side of the vehicle body, and extends obliquely rearward. A lower end 63l of the branch pillar 63 is fixed to the chassis 2, that is, to the rear lateral bar portion 27a of the rear cross member 27, for example, by bolts 60 and the like. Since stress applied to the R.O.P.S. 5 is dispersed to the chassis 2 via the branch pillar 63, rigidity of the R.O.P.S. 5 is enhanced.

As shown in FIGS. 4, 5 and 7, multiple constitutional elements constituting a rear portion of the R.O.P.S. 5, that is, the side beam 52, the rear beam 55, and the rear pillar 53, are connected by the connecting portion 71. Specifically, the rear end 52r of the side beam 52, the third mounting portion 59a secured to the side end 55s of the rear beam 55, and the upper end 53u of the rear pillar 53 are connected by the connecting portion 71. The connecting portion 71 is located on the outer side in the width direction of the vehicle body with respect to the above-described constitutional elements to be connected. The connecting portion 71 is approximately inverted V-shaped in side view, and has a substantially semicircular cross section. In the connecting portion 71, third screw holes 71b corresponding to the third through holes 59d, fourth screw holes 71c corresponding to the fourth through holes 52d, and fifth screw holes 71d corresponding to the fifth through holes 53d are formed. The third screw holes 71b, the fourth screw holes 71c, and the fifth screw holes 71d are, for example, blind holes. The third through holes 59d, the fourth through holes 52d, and the fifth through holes 53d are positioned against the third screw holes 71b, the fourth screw holes 71c, and the fifth screw holes 71d, respectively. In this state, the rear end 52r, the third mounting portion 59a, and the upper end 53u are fastened from the inside in the width direction of the vehicle body to the connection portion 71 by bolts 60, respectively. As a result, the rear end 52r of the side beam 52, the side end 55s of the rear beam 55, and the upper end 53u of the rear pillar 53 are integrally connected via the connecting portion 71.

The connecting portion 71 is fixed to the front end 70f of the rear support 70, for example, by welding or bolts, and is integrated with the rear support 70. Therefore, the side beam 52, the rear beam 55, the rear pillar 53, and the rear support 70 are integrally connected by the connecting portion 71. A rear end 70r of the rear support 70 is connected to the rear portion 2R of the chassis 2, for example, by welding or bolts, and is preferably connected to the chassis 2 as rearward as possible in the longitudinal direction of the chassis 2. Specifically, the rear end 70r of the rear support 70 is connected to the rear curved frame portion 24c of the rear frame 24 so as to be located rearward of the carrier 6 in the longitudinal direction of the vehicle body. By locating the rear support 70 rearward of the carrier 6, the carrier 6 is protected, stress applied to the R.O.P.S. 5 is dispersed more effectively, and thereby rigidity of the R.O.P.S. 5 is enhanced.

As shown in FIG. 3, the rear support 70 has an arch shape protruding upward. When stress from the height direction of the vehicle body is applied to the rear support 70, stress is dispersed effectively by the arch shape of the rear support 70, and thereby rigidity of the rear support 70 is enhanced.

As shown in FIG. 3, the connecting portion 71 is configured to be located at the highest position in the vertical direction of the R.O.P.S. 5. According to this configuration, when stress from the height direction of the vehicle body is applied to the R.O.P.S. 5, stress is dispersed more effectively via the connecting portion 71 located at the highest position in the vertical direction of the R.O.P.S. 5, and thereby rigidity of the R.O.P.S. 5 is enhanced.

As shown in FIGS. 3 and 4, ridge lines 51a of the front pillars 51 in side view, a ridge line 54a of the front beam 54 when viewed obliquely downward and frontward from the rear side, and the front pillar mounting portion 56b of the first bracket 56 are substantially on the same plane. As a result, the front surface part 81 is formed by the ridge lines 51a of the front pillars 51, the ridge line 54a of the front beam 54, and the mounting portions 56b. The front surface part 81 serves as a front mounting portion to which a plate-like or sheet-like accessory member is mounted. The front face portion 81 serving as the front mounting portion is substantially flat. The front support portion 57b of the second bracket 57 is substantially flush with the front surface part 81 serving as the front mounting portion, and is substantially flat. Therefore, it is easy to arrange and mount the accessory member to the front support portion 57b.

As the accessory member covering a front part of the R.O.P.S. 5, for example, the windshield 91 (shown in FIG. 3 by a dotted line) made of a transparent resin is configured to be mountable in close contact with the front surface part 81. The windshield 91 has a plate shape or a sheet shape, and has left and right side end portions (not shown) and left and right upper corner portions (not shown). The upper corner portion of the windshield 91 corresponds to the front support portion 57b, and the front support portion 57b is used for mounting and supporting the upper corner portion of the windshield 91. Therefore, mounting property of the windshield 91 is improved.

Similarly, ridge lines 52a of the left and right side beams 52 in side view, a ridge line 54b of the front beam 54 in front view, a ridge line 55a of the rear beam 55 in rear view, and the side beam mounting portion 56c of the first bracket 56 are substantially on the same plane. As a result, the upper surface part 82 being substantially flat is formed on the upper surface of the R.O.P.S. 5 by the ridge lines 52a of the right side beams 52, the ridge line 54b of the front beam 54, the ridge line 55a of the rear beam 55, and the mounting portions 56c. The upper surface part 82 serves as an upper mounting portion to which the plate-like or sheet-like accessory member is mounted. The front roof support portion 57c of the second bracket 57 and the rear roof support portion 59b of the third bracket 59 are substantially flush with the upper surface part 82 serving as the upper mounting portion, and are substantially flat. Therefore, it is easy to arrange and mount the accessory member to the front roof support portion 57c and the rear roof support portion 59b.

As an accessory member covering an upper part of the R.O.P.S. 5, for example, the roof 92 (shown in FIG. 3 by a dotted line) which is colored and made of resin is configured to be mountable in close contact with the upper surface part 82. The roof 92 has a plate shape or a sheet shape, and has left and right side end portions (not shown), left and right front corner portions (not shown), and right and left rear corner portions (not shown). The front corner portion of the roof 92 corresponds to the front roof support portions 57c, and the front roof support portion 57c is used for mounting and supporting the front corner portion of the roof 92. Therefore, mounting property of the roof 92 is improved. Similarly, the rear corner portion of the roof 92 corresponds to the rear roof support portions 59b, and the rear roof support portion 59b is used for mounting and supporting the rear corner portion of the roof 92. Therefore, mounting property of the roof 92 is improved.

Further, as shown in FIG. 8, ridge lines 53g at upper parts of the rear pillar upper portions 53a above the branch pillars 63 in side view, ridge lines 63a of the branch pillars 63 in side view, and the ridge line 55b of the rear beam 55 when viewed obliquely downward from the front side to the rear side are substantially on the same plane. As a result, the rear surface part 83 being substantially flat is formed by the ridge lines 53g, the ridge lines 63a, and the ridge line 55b. The rear surface part 83 serves as a rear mounting portion to which the plate-like or sheet-like accessory member is mounted. The rear support portion 59c of the third bracket 59 is substantially flush with the rear surface part 83 serving as the rear mounting portion, and is substantially flat. Therefore, it is easy to arrange and mount the accessory member to the rear support portion 59c.

As an accessory member covering a rear part of the R.O.P.S. 5, for example, the rear windshield 93 (shown in FIG. 3 by a dotted line) made of a transparent resin is configured to be mountable in close contact with the rear surface part 83. The rear windshield 93 has a plate shape or a sheet shape, and has left and right side end portions (not shown) and left and right upper corner portions (not shown). The upper corner portion of the rear windshield 93 corresponds to the rear support portion 59c, and the rear support portion 59c is used for mounting and supporting the upper corner portion of the rear windshield 93. Therefore, mounting property of the rear windshield 93 is improved.

In addition to the front surface part 81, the upper surface part 82 and the rear surface part 83 which serve as mounting portions, the support portions 57b, 57c, 59b, 59c disposed at the respective corner portions 58a, 58b, 58c, 58d are used for mounting the plate-like or sheet-like accessory members 91, 92, 93. Therefore, mounting property of the accessory members 91, 92, 93 is improved.

If there is a level difference at the front surface part 81, the upper surface part 82 and the rear surface part 83 of the R.O.P.S. 5, a spacer for eliminating the level difference is necessary. However, in the R.O.P.S. 5 of the above embodiment, since the front surface part 81, the upper surface part 82, and the rear surface part 83 are formed substantially on the same plane so as to eliminate substantially the level difference, the spacer becomes unnecessary. At the same time, the plate-like or sheet-like accessory member (for example, the windshield 91, the roof 92, the rear windshield 93) can be surely and easily mounted.

As described above, a utility vehicle 1 according to one aspect of the present invention, comprising:

a chassis 2; and a R.O.P.S. 5 provided on the chassis and surrounding a cabin S, wherein the R.O.P.S. 5 includes a pair of left and right front pillars 51, a pair of left and right side beams 52, a pair of left and right rear pillars 53, and a front beam 54 and a rear beam 55 which extend in a width direction of a vehicle body, wherein the R.O.P.S. 5 has a connecting portion 71 connecting a rear end 52r of the side beam 52, a side end 55s of the rear beam 55 and an upper end 53u of the rear pillar 53, and wherein between the connecting portion 71 and a rear portion 2R of the chassis 2, a rear support 70 for supporting the R.O.P.S. 5 from a rear side is disposed.

According to the configuration, since the R.O.P.S. 5 is supported from the rear side by the rear support 70 disposed between the connecting portion 71 and the rear portion 2R of the chassis 2, when stress from the longitudinal direction of the vehicle body, the width direction of the vehicle body and the height direction of the vehicle body is applied to the R.O.P.S. 5, stress is dispersed to the chassis 2 via the rear support 70, and thereby rigidity of the R.O.P.S. 5 is enhanced.

In one embodiment, the connecting portion 71 is located at the highest position in the vertical direction of the R.O.P.S. 5.

According to the configuration, when stress from the height direction of the vehicle body is applied to the R.O.P.S. 5, stress is dispersed more effectively via the connecting portion 71 located at the highest position in the vertical direction of the R.O.P.S. 5, and thereby rigidity of the R.O.P.S. 5 is enhanced.

In one embodiment, the rear pillar 53 has a branch pillar 63 extending downward and connected to the chassis 2.

According to the configuration, since stress applied to the R.O.P.S. 5 is dispersed to the chassis 2 via the branch pillar 63, rigidity of the R.O.P.S. 5 is enhanced.

In one embodiment, the rear support 70 has an arch shape protruding upward.

According to the configuration, when stress from the height direction of the vehicle body is applied to the rear support 70, stress is dispersed effectively by the arch shape of the rear support 70, and thereby rigidity of the rear support 70 is enhanced.

In one embodiment, a carrier 6 is disposed behind the R.O.P.S. 5, and a rear end 70r of the rear support 70 is located rearward of the carrier 6 in a longitudinal direction of the vehicle body.

According to the configuration, the carrier 6 is protected by the rear support 70, stress applied to the R.O.P.S. 5 is dispersed more effectively, and thereby rigidity of the R.O.P.S. 5 is enhanced.

According to another aspect of the present invention, a utility vehicle 1 comprising:

a chassis 2; and a R.O.P.S. 5 provided on the chassis 2 and surrounding a cabin S, wherein the R.O.P.S. 5 includes a pair of left and right front pillars 51, a pair of left and right side beams 52, a pair of left and right rear pillars 53, and a front beam 54 and a rear beam 55 which extend in a width direction of a vehicle body, wherein a front surface part 81 is formed by the front pillars 51 and the front beam 54, an upper surface part 82 is formed by the side beams 52, the front beam 54 and the rear beam 55, and a rear surface part 83 is formed by the rear beam 55 and the rear pillars 53, wherein at least one of the front surface part 81, the upper surface part 82 and the rear surface part 83 serves as a mounting portion for mounting each of accessory members 91, 92, 93, wherein at each of corner portions 58a, 58b, 58c, 58d of the front surface part 81, the upper surface part 82 and the rear surface part 83 to which the each of the accessory members 91, 92, 93 is mounted, each of support portions 57b, 57c, 59b, 59c for supporting the each of the accessory members 91, 92, 93 is disposed, and wherein the each of the support portions 57b, 57c, 59b, 59c is substantially flush with the mounting portion.

According to the configuration, in addition to the front surface part 81, the upper surface part 82 and the rear surface part 83 which serve as a mounting portion, the each of the support portions 57b, 57c, 59b, 59c disposed at the respective corner portion 58a, 58b, 58c, 58d is used for mounting the each of the accessory members 91, 92, 93. Therefore, mounting property of the accessory members 91, 92, 93 is improved.

In one embodiment, the each of the support portions 57b, 57c, 59b, 59c is provided on a bracket 57, 59 of the front beam 54 or the rear beam 55.

According to the configuration, since the each of the support portions 57b, 57c, 59b, 59c is disposed on the bracket 57, 59 of the front beam 54 or the rear beam 55, workability when assembling the R.O.P.S. 5 is good.

In one embodiment, the each of the support portions 57b, 57c, 59b, 59c has a substantially triangular shape and has a substantially plate shape so as to fit to the each of the corner portions 58a, 58b, 58c, 58d corresponding to the each of the support portions 57b, 57c, 59b, 59c.

According to the configuration, since the each of the support portions 57b, 57c, 59b, 59c serves as a gusset fitted to the each of the corner portions 58a, 58b, 58c, 58d corresponding to the each of the support portions 57b, 57c, 59b, 59c, rigidity of the R.O.P.S. 5 is enhanced.

In one embodiment, the each of the support portions 57b, 57c, 59b, 59c is substantially flat.

According to the configuration, it is easy to arrange and mount the each of the accessory members 91, 92, 93 to the each of the support portions 57b, 57c, 59b, 59c.

Although the embodiments have been specifically described to exemplify the technical feature of the present invention as an example, the embodiments are not limited to the above-mentioned embodiments. Various constitutional elements are merely examples for explaining the embodiments, and do not limit them, and hence, various modifications, alterations, additions and omissions and the like of the present invention can be made within scope of claims or within a range equivalent to scope of claims.

What is claimed is:

1. A utility vehicle comprising:

a chassis; and a roll-over protective structure provided on the chassis and surrounding a cabin, wherein the roll-over protective structure includes a pair of left and right front pillars, a pair of left and right side beams, a pair of left and right rear pillars, and a front beam and a rear beam which extend in a width direction of a vehicle body, wherein the roll-over protective structure has a connecting portion connecting a rear end of the side beam, a side end of the rear beam and an upper end of the rear pillar, wherein a rear support is disposed between the connecting portion and a rear portion of the chassis, the rear support being configured to support the roll-over protective structure from a rear side, and wherein the rear end of the side beam, the side end of the rear beam, the upper end of the rear pillar and a front end of the rear support are integrally connected by the connecting portion.

2. The utility vehicle according to claim 1, wherein the connecting portion is located at the highest position in a vertical direction of the roll-over protective structure.

3. The utility vehicle according to claim 1, wherein the rear pillar has a branch pillar extending downward and connected to the chassis.

4. The utility vehicle according to claim 1, wherein the rear support has an arch shape protruding upward.

5. The utility vehicle according to claim 1, wherein a carrier is disposed behind the roll-over protective structure, and a rear end of the rear support is located rearward of the carrier in a longitudinal direction of the vehicle body.

6. A utility vehicle comprising:

a chassis; and a roll-over protective structure provided on the chassis and surrounding a cabin, wherein the roll-over protective structure includes a pair of left and right front pillars, a pair of left and right side beams, a pair of left and right rear pillars, and a front beam and a rear beam which extend in a width direction of a vehicle body, wherein a front surface part is formed by the front pillars and the front beam, an upper surface part is formed by the side beams, the front beam, and the rear beam, and a rear surface part is formed by the rear beam and the rear pillars, wherein at least one of the front surface part, the upper surface part and the rear surface part serves as a mounting portion for mounting each of accessory members, wherein at each of corner portions of the front surface part, the upper surface part and the rear surface part to which the each of the accessory members is mounted, each of support portions for supporting the each of the accessory members is disposed, and wherein the each of the support portions is substantially flush with the mounting portion.

7. The utility vehicle according to claim 6, wherein the each of the support portions is provided on a bracket of the front beam or the rear beam.

8. The utility vehicle according to claim 6, wherein the each of the support portions has a substantially triangular shape and has a substantially plate shape so as to fit to the each of the corner portions corresponding to the each of the support portions.

9. The utility vehicle according to claim 6, wherein the each of the support portions is substantially flat.

* * * * *